United States Patent [19]

West

[11] Patent Number: 4,858,379
[45] Date of Patent: Aug. 22, 1989

[54] LANDSCAPE EDGING

[76] Inventor: David W. West, 215 Robin Hill Dr., Naperville, Ill. 60540

[21] Appl. No.: 155,562

[22] Filed: Feb. 12, 1988

[51] Int. Cl.$^4$ ............................................. A01G 1/08
[52] U.S. Cl. ........................................... 47/33; 52/102
[58] Field of Search .................... 47/32, 33, 25; 404/6, 404/7, 8; 52/102, 103; 446/120, 125, 127

[56] References Cited

U.S. PATENT DOCUMENTS

| | | | |
|---|---|---|---|
| 1,084,597 | 1/1914 | Anft | 446/127 |
| 2,662,342 | 12/1953 | Peterson | 47/33 |
| 2,907,137 | 10/1959 | Ehrmann | 446/127 |
| 3,086,629 | 4/1963 | Blitzer | 446/125 |
| 3,378,949 | 4/1968 | Dorris | 47/33 |
| 3,485,449 | 12/1969 | Wilson | 47/33 |
| 3,745,701 | 7/1973 | Marvin | 52/102 X |
| 4,809,459 | 3/1989 | Brylla et al. | 47/33 |

FOREIGN PATENT DOCUMENTS

| | | | |
|---|---|---|---|
| 1053993 | 11/1957 | Fed. Rep. of Germany | 446/127 |
| 2336535 | 7/1973 | Fed. Rep. of Germany | 47/33 |
| 2635432 | 8/1976 | Fed. Rep. of Germany | 47/33 |
| 1004227 | 3/1952 | France | 446/127 |
| 683336 | 11/1952 | United Kingdom | 404/7 |

Primary Examiner—Robert A. Hafer
Assistant Examiner—Kevin G. Rooney
Attorney, Agent, or Firm—Edmond T. Patnaude

[57] ABSTRACT

An edging member is adapted to be provided in separate sections having identical cross-sectional configurations which include a male interlocking portion along one edge and a female interlocking portion located intermediate the edge defined by the male interlocking portion and another edge of a longitudinal plate-like member. Two sections of the edging member may be interlocked in perpendicular relationship so that one member which is located in a horizontal position at the top provides a protective cover and the other section which depends perpendicularly therefrom provides an earth anchor for locking the assembly in place.

7 Claims, 2 Drawing Sheets

LANDSCAPE EDGING

The present invention relates in general to an article for forming edges for gardens and the like, and it relates more particularly to a new and improved edge member which may also be used to direct the flow of surface water away from the foundation of a building or other structure.

BACKGROUND OF THE INVENTION

Landscape edging is commonly formed of flexible plastic or metal and is packaged in relatively long rolls or in generally straight sections. When the prior art edging is to be used, a desired length is cut from the longer length and is then shaped to conform to the border to be edged. The edging is generally secured in place by partially burying it in the ground. Such prior art edging members have not been used to divert the flow of surface water away from foundations nor have they been suitable for that purpose.

Surface water does at times, such as during rain storms and the like, tend to flow against structural foundations causing soil erosion and other problems where, for example, it seeps into basements. Attempts to prevent this problem have included banking of soil against the foundation, but the soil itself is slowly eroded away or settles down. Moreover, in order to keep the area surrounding the foundation in a visually attractive condition considerable time and effort is usually required.

SUMMARY OF THE INVENTION

Briefly, in accordance with the present invention there is provided a novel edging member which includes portions constituting male and female interlocking sections so that two separate lengths of the edging may be interlocked together to provide an anchoring section which is embedded in the ground in a generally vertical position and a flat cover section which inhibits vegetation growth and lies on top of the ground adjacent to the foundation which is to be edged. When the two sections are assembled, the product is rigid and thus is easier to handle in that it does not tend to roll up during installation as is the case with many of the edging products of the prior art.

In the preferred embodiment of the invention, the male interlocking section is provided along one longitudinal edge of the edging and extends a short distance up from the top surface of the cover section to provide a raised lip which when positioned against the structure to be edged helps to divert rain water away from the building or other structure. The raised lip also gives the cover section an attractive finished appearance.

The female interlocking section is preferably provided in a relatively short, laterally protruding, longitudinal section on one side only of the edging member to serve as an anchor to retain the embedded section in a fixed position in the ground. As a result of this configuration, the opposite side of the edging member which may be used to form the top surface of the corner section is flat so as not to collect water or dirt thereon.

It will be understood that the edging member of the present invention may also be used in the more conventional manner along the borders of gardens, driveways, tree wells and the like. When thus used only one section need be employed to reduce the cost of the edging material.

GENERAL DESCRIPTION OF THE DRAWINGS

Further objects and advantages and a better understanding of the present invention will be had by reference to the following detailed description taken in connection with the accompanying drawings wherein.

DETAILED DESCRIPTION OF A PREFERRED EMBODIMENT OF THE INVENTION

Figure 1:
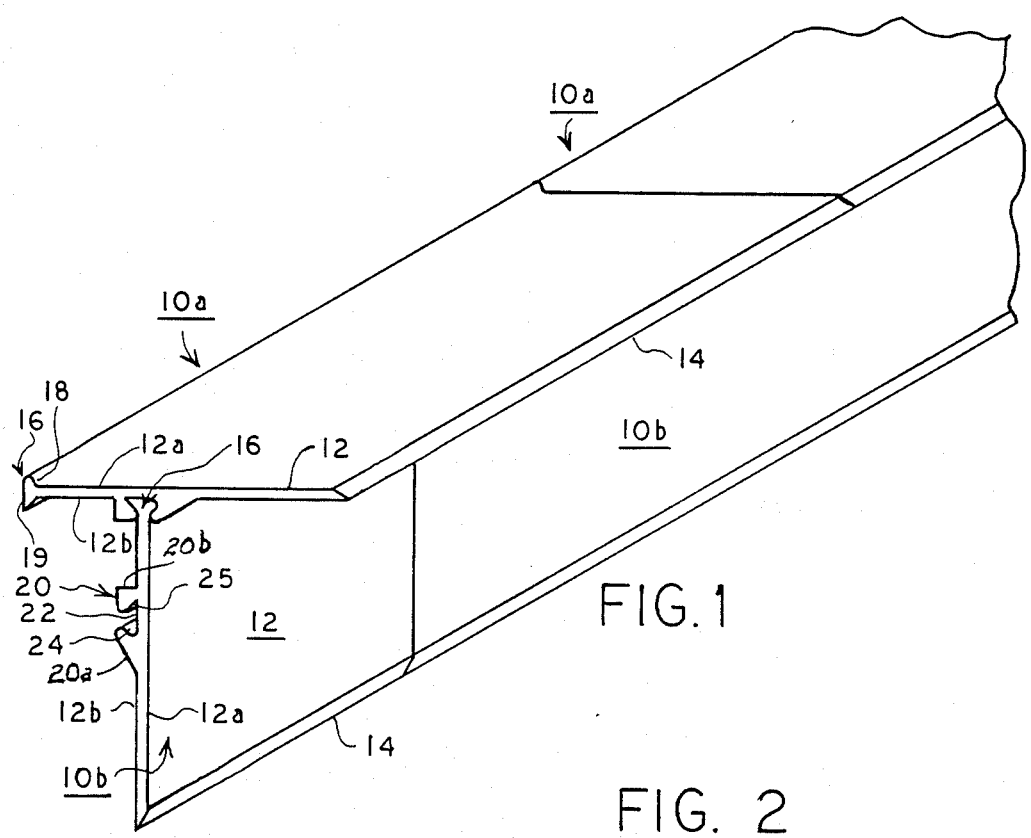
FIG. 1 is a perspective view of an edging assembly embodying the present invention.

Referring particularly to FIG. 1, two identical edging members 10a and 10b are shown in mutually perpendicular interlocked relationship. Each of the members 10 comprises a relatively thin, plate-like web 12 having a longitudinally extending knife edge 14. A flange 16 constitutes the other longitudinal edge. The flange 16 constitutes a male interlocking member and includes first and second longitudinal beads 18 and 19 which are raised a short distance above the associated planar surface of the web 12. In the illustration of FIG. 1, the bead 18 is generally arcuate and extends upwardly from the top surface 12a of the web 12 while the bead 19 is generally pointed and extends downwardly from the bottom surface 12b of the web 12.

Extending from the surface 12b about one-third the distance between the flange 16 and the edge 14 is a laterally protruding longitudinal portion 20 which protrudes a short distance from the surface 12b. The portion 20 has a tapered exterior wall 20a and a squared exterior wall 20b. The portion 20 may be seen to include a longitudinal groove 22 having undercut sides 24 and 25 defining undercut grooves which are complementary to the beads 18 and 19 and which are adapted to receive the respective beads 18 and 19 to retain the two edging members in interlocked assembled relationship.

As shown in FIG. 1, there are two upper members 10a positioned in end-to-end, aligned relationship and two lower members 10b also positioned in end-to-end relationship. Preferably, the joints between the upper and lower sections are staggered to obviate the need for separate connectors or adapters to secure the separate sections together.

Figure 2:
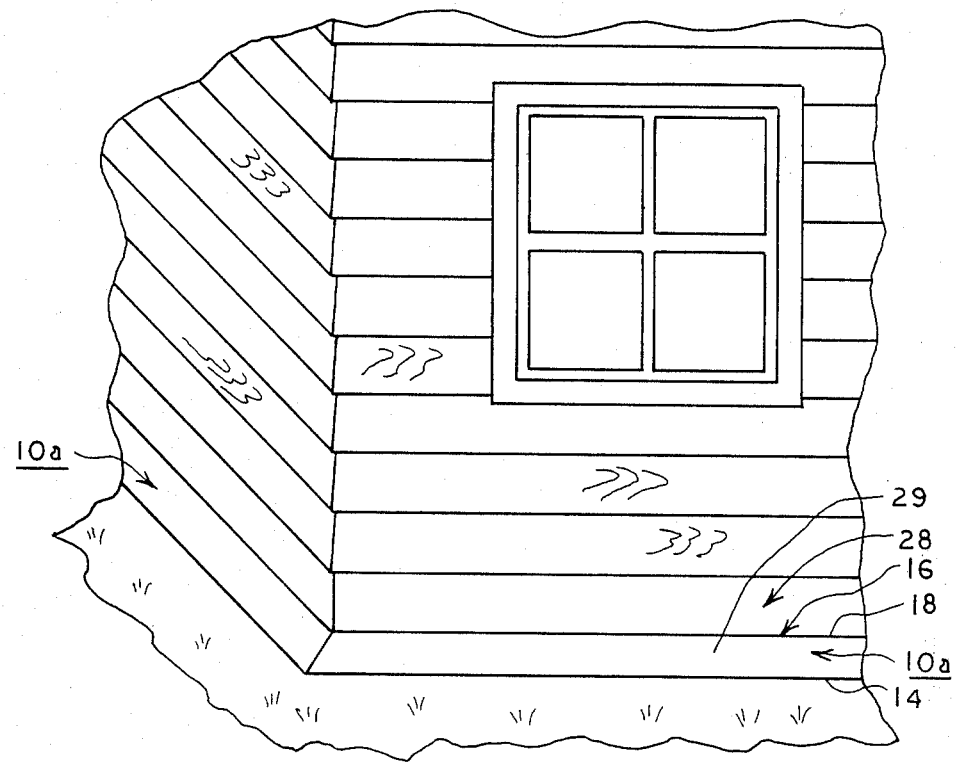
FIG. 2 is a fragmentary perspective view showing use of the edging assembly of FIG. 1 against the foundation of a house.
Figure 3:
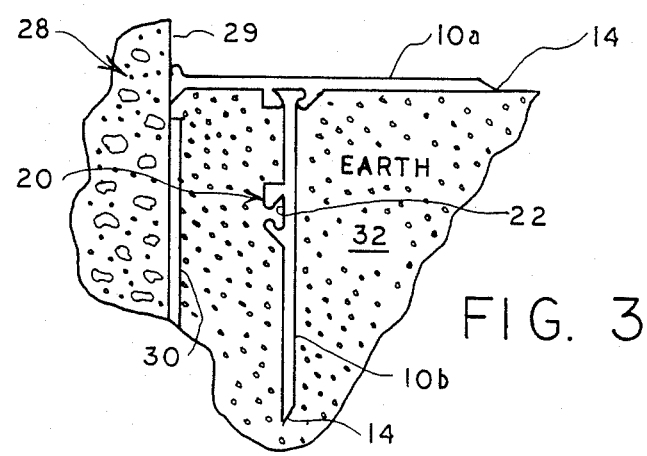
FIG. 3 is a cross-sectional, elevational view showing the edging assembly of the present invention in use against the foundation of a building.

Referring to FIGS. 2 and 3, the assembly of the edging members 10a and 10b is shown in use as a border for the foundation of a building. As there shown, the flange 16 of an upper edging member 10a is in approximate abutment with the outside surface 28 of a foundation wall 29 just above an outside insulation sheet 30 (FIG. 3) which is affixed to the wall 29. As best shown in FIG. 3, the web 12 of the cover member 10a rests on the top surface of the soil 32 in which the foundation is embedded. A second edge member 10b has its flange 16 located at the top and positioned in the groove 22 on the bottom of the web 10a so that its web 12 depends into the soil 32. The web 12 of the upper edging member 10a is substantially horizontal but may slope at a shallow angle away from the wall 29 without detracting from the appearance of the edging. Inasmuch as the interlocking sections of the members 10a and 10b are covered by the cover member 10a, the interlock cannot be seen, and more importantly, the interlock is protected from the elements. Also the laterally protruding part 20 on the section 10b helps to anchor the edging in place.

Figure 4:
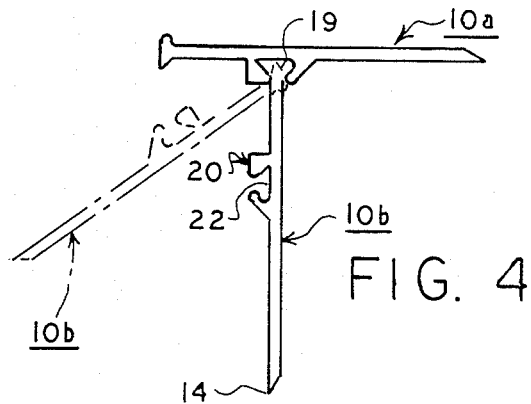
FIG. 4 shows an elevational view showing two sections of the edging member of the present invention during the assembly of one section to the other.

The edging member 10 may be relatively stiff and thus distributed in sections of, for example, six to ten feet. The side walls of the groove 22 should, therefore, be resilient to permit the male edge 16 of one section to be snapped in place into the groove 22 of the other section. With reference to FIG. 4, the section 10b is shown in dot-dash lines during the assembly step wherein the bead 19 of the lower section 10b is first inserted into the groove 22 of the upper section 10a and then the lower section 10b is swung counterclockwise relative to the upper section 10a to cause the bead 18 to snap into place as the adjacent wall of the groove 22 is deflected to permit the bead 18 to move into the undercut section 24 of the groove 22.

Figure 5:
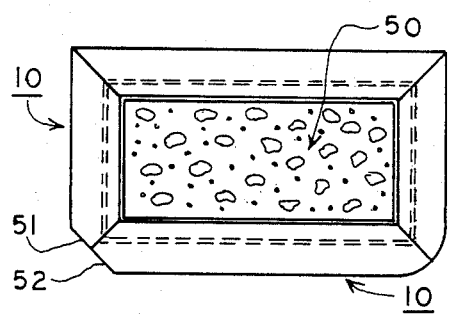
FIG. 5 shows another use of the edging member of the present invention.

Referring to FIG. 5, the use of the edging 10 for forming a border around a rectangular structure 50 is shown. The structure 50 may be, for example, a grave marker. The lower left hand corner shows the outside corners of the abutting edging members 10 to have been cut to provide outside edges 51 and 52 which are respectively aligned. The lower right-hand corner shows the outside corners of the abutting edging members to have been rounded. As may thus be seen, different corner arrangements can be provided for purposes of esthetics.

Figure 6:
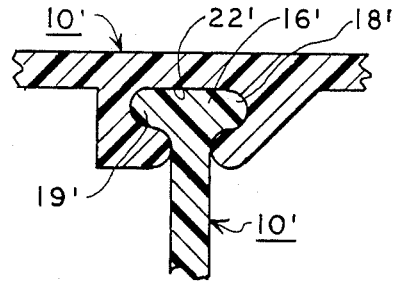
FIG. 6 is an enlarged cross-sectional view showing the connections between two sections of the edging of another embodiment of the present invention.

Referring to FIG. 6, there is shown in cross-section the connector portions of two edging members 10. In this embodiment of the invention the beads 18' and 19' are of the same configuration and the undercut groove 22' is complementary thereto. When using this embodiment of the invention the lower edging member 10', which is normally embedded in the ground, may be positioned with its connector portion toward or away from the structure to be edged.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of the present invention.

What is claimed:
1. An edging member comprising
a generally elongate, rectangular plate-like flexible section having mutually parallel longitudinally extending side edges, and mutually parallel end edges,
said member having first and second planar faces on opposite sides thereof,
first and second elongate beads extending respectively from said faces at one of said side edges in opposite directions and providing a first elongate interlocking section,
said beads extending continuously from one to the other of said ends,
an elongate portion protruding laterally from said first planar face intermediate said side edges and which extends from one to the other of said ends in parallel relationship to said side edges,
said elongate portion being provided with a groove extending from one to the other of said ends and which is complementary in cross-section to said first interlocking section thereby to provide a second interlocking section,
whereby two of said edging members may be connected together to form a T by positioning said first interlocking section of one member in said second interlocking section of the other member.

2. An edging member according to claim 8 wherein said second elongate interlocking section protrudes from one face only of said plate-like section.

3. An edging member according to claim 1 wherein said second interlocking elongate section comprises means defining a longitudinal groove having a longitudinally extending undercut portion adapted to receive said bead.

4. An edging member according to claim 3 wherein said means defining a groove is resilient to permit said interlocking sections to be snap-fitted together.

5. An edging member according to claim 1 wherein, said other side edging member is a knife edge and said second planar face extends uninterrupted from said second bead to said knife edge.

6. In combination, an edging and a structure including a foundation wall, comprising
first and second lengths of the edging member set forth in claim 1,
the first interlocking section of said first length being interlocked with the second interlocking section of said second length,
said bead on said second length being positioned in proximity to said foundation wall and said first length being in substantially parallel relationship with said foundation wall.

7. The invention set forth in claim 6, wherein said foundation wall is embedded in an embedding material, and
said second interlocking section of said first length is embedded in said embedding material.

* * * * *

UNITED STATES PATENT AND TRADEMARK OFFICE
CERTIFICATE OF CORRECTION

PATENT NO. : 4,858,379
DATED : August 22, 1989
INVENTOR(S) : David W. West

It is certified that error appears in the above-identified patent and that said Letters Patent is hereby corrected as shown below:

Claim 2, line 1, "8" should be -1-.

Signed and Sealed this

Twelfth Day of June, 1990

*Attest:*

HARRY F. MANBECK, JR.

*Attesting Officer*  *Commissioner of Patents and Trademarks*